(12) United States Patent
Muranaka et al.

(10) Patent No.: US 8,167,019 B2
(45) Date of Patent: May 1, 2012

(54) SHADE APPARATUS FOR VEHICLE

(75) Inventors: Makoto Muranaka, Kariya (JP); Shinji Sakai, Kariya (JP); Kazuki Sawada, Handa (JP); Kazushige Kawamura, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 96 days.

(21) Appl. No.: 12/591,345

(22) Filed: Nov. 17, 2009

(65) Prior Publication Data
US 2010/0122778 A1    May 20, 2010

(30) Foreign Application Priority Data

Nov. 20, 2008   (JP) ................................. 2008-296725

(51) Int. Cl.
*E05D 15/00* (2006.01)

(52) U.S. Cl. ... 160/202; 160/214; 160/222; 160/370.21; 296/216.01; 296/216.04; 296/214

(58) Field of Classification Search .................... 160/37, 160/32, 202, 214, 222, 107, 370, 370.21, 160/197, 113, DIG. 2–DIG. 3; 296/214, 296/220.01, 216.04, 216.01, 222, 223, 224, 296/216.06–216.09
See application file for complete search history.

(56) References Cited

U.S. PATENT DOCUMENTS

| 1,042,380 | A | * | 10/1912 | Baker | 160/37 |
| 1,732,447 | A | * | 10/1929 | Crane | 296/97.8 |
| 2,120,986 | A | * | 6/1938 | Morris | 160/37 |
| 2,122,712 | A | * | 7/1938 | Henry | 296/220.01 |
| 3,683,993 | A | * | 8/1972 | Perks | 160/37 |
| 3,691,686 | A | * | 9/1972 | Donegan | 49/56 |
| 4,872,722 | A | * | 10/1989 | Farmont | 296/214 |
| 4,911,496 | A | * | 3/1990 | Fuerst | 296/220.01 |
| 5,005,899 | A | * | 4/1991 | Clenet | 296/214 |
| 5,114,208 | A | * | 5/1992 | Ikeda et al. | 296/216.04 |
| 5,197,779 | A | * | 3/1993 | Mizuno et al. | 296/220.01 |
| 5,372,401 | A | * | 12/1994 | Odoi et al. | 296/214 |
| 5,570,979 | A | * | 11/1996 | Okamoto et al. | 409/134 |
| 5,996,284 | A | * | 12/1999 | Freimark et al. | 49/209 |
| 6,012,767 | A | * | 1/2000 | Farmont | 296/214 |
| 6,015,184 | A | * | 1/2000 | Ewing et al. | 296/219 |

(Continued)

FOREIGN PATENT DOCUMENTS

JP    2000-203265    7/2000

(Continued)

*Primary Examiner* — Katherine W Mitchell
*Assistant Examiner* — Johnnie A Shablack
(74) *Attorney, Agent, or Firm* — Finnegan, Henderson, Farabow, Garrett & Dunner, LLP

(57) ABSTRACT

A shade apparatus for a vehicle includes a guide rail mechanism adapted to be arranged along a side portion of an inner periphery of an opening formed in an interior ceiling member of the vehicle, a shade panel mechanism slidably supported by the guide rail mechanism, configured to open and close the opening of the interior ceiling member, and including first and second shade panels, an engaging member arranged at one of the first and second shade panels, and an elastic member arranged at the other of the first and second shade panels and including a fixing portion and a deformable portion. The first and second shade panels move as a unit in the moving direction after one of the first and second shade panels moves relative to the other of the first and second shade panels in the moving direction and the engaging member engages with the elastic member.

12 Claims, 9 Drawing Sheets

U.S. PATENT DOCUMENTS

| | | | |
|---|---|---|---|
| 6,052,859 A * | 4/2000 | Diels | 15/256.5 |
| 6,179,034 B1 * | 1/2001 | Fuss | 160/105 |
| 6,196,626 B1 * | 3/2001 | Ito | 296/214 |
| 6,443,520 B1 * | 9/2002 | Schmaelzle et al. | 296/216.08 |
| 6,491,332 B2 * | 12/2002 | De Ceuster | 296/37.16 |
| 6,513,864 B2 * | 2/2003 | Bohm et al. | 296/214 |
| 6,599,140 B1 * | 7/2003 | Chen et al. | 439/135 |
| 6,685,263 B2 * | 2/2004 | Sawada et al. | 296/216.06 |
| D499,997 S * | 12/2004 | Linnartz et al. | D12/191 |
| 7,063,379 B2 * | 6/2006 | Steuer et al. | 296/223 |
| 7,086,682 B2 * | 8/2006 | Neaux | 296/97.4 |
| 7,140,663 B1 * | 11/2006 | Thacker | 296/97.4 |
| 7,314,079 B2 * | 1/2008 | Yano et al. | 160/370.22 |
| 7,384,096 B2 * | 6/2008 | Yamada et al. | 296/216.06 |
| 7,416,246 B2 * | 8/2008 | Hesse et al. | 296/216.01 |
| 7,699,387 B2 * | 4/2010 | Gonzalez et al. | 296/214 |
| 7,775,255 B2 * | 8/2010 | Albert | 160/290.1 |
| 2003/0127884 A1 * | 7/2003 | Sawada et al. | 296/216.09 |
| 2004/0051995 A1 * | 3/2004 | Kim et al. | 360/96.1 |
| 2004/0068839 A1 * | 4/2004 | Hock et al. | 16/215 |
| 2004/0130189 A1 * | 7/2004 | Bohm et al. | 296/220.01 |
| 2005/0028948 A1 * | 2/2005 | Austin | 160/370.21 |
| 2005/0194108 A1 * | 9/2005 | Lin | 160/370.21 |
| 2007/0069553 A1 * | 3/2007 | Yamada et al. | 296/216.07 |
| 2008/0035283 A1 * | 2/2008 | Miyachi et al. | 160/370.21 |
| 2008/0083518 A1 * | 4/2008 | Sadornil et al. | 160/370.21 |
| 2009/0224573 A1 * | 9/2009 | Sawada | 296/216.07 |
| 2010/0032992 A1 * | 2/2010 | Keller | 296/216.01 |
| 2010/0038932 A1 * | 2/2010 | Comfort et al. | 296/216.08 |
| 2011/0024058 A1 * | 2/2011 | Kernmayer et al. | 160/113 |

FOREIGN PATENT DOCUMENTS

JP  2004-249851  9/2004

* cited by examiner

SHADE APPARATUS FOR VEHICLE

CROSS REFERENCE TO RELATED APPLICATIONS

This application is based on and claims priority under 35 U.S.C. §119 to Japanese Patent Application 2008-296725, filed on Nov. 20, 2008, the entire content of which is incorporated herein by reference.

TECHNICAL FIELD

This disclosure relates to a shade apparatus for a vehicle, which includes a plurality of shade panels.

BACKGROUND DISCUSSION

A known shade apparatus for a vehicle described in JP2000-203265A (hereinafter referred to as Patent document 1) includes guide rails and two shade panels serving as a front driving shade panel and a rear driven shade panel. The guide rails are arranged along side edges of an opening formed in an interior ceiling member of the vehicle and extending along a longitudinal direction of the vehicle. The shade panels are slidably supported by the guide rails therewithin. The shade panels open and close the opening of the interior ceiling member.

Further, in the shade apparatus according to Patent document 1, the front driving shade panel and the rear driven shade panel are arranged in opening and closing directions, respectively. The opening direction is a front side in a longitudinal direction of the shade apparatus while the closing direction is a rear side in the longitudinal direction of the shade panel apparatus. The front driving shade panel includes first and second engaging portions formed at the lateral front and rear ends, respectively, in the closing direction relative to the rear driven shade panel. The rear driven shade panel includes engaged portions formed at the front ends in the closing direction relative to the front driving shade panel.

Under a closed condition of the opening of the interior ceiling member in the shade apparatus according to Patent document 1, when the front driving shade panel is slid in the opening direction, the first engaging portions engage with the engaged portions of the rear driven shade panel, thereby sliding the rear driven shade panel in the opening direction. As a result, the opening of the interior ceiling member is opened. Meanwhile, under an opened condition of the opening of the interior ceiling member in the shade apparatus, when the front driving shade panel is slid in the closing direction, the second engaging portions of the front driving shade panel engage with the engaged portions of the rear driven shade panel, thereby sliding the rear driven shade panel in the closing direction. As a result, the opening of the interior ceiling member is closed.

In the shade apparatus according to Patent document 1, while the front driving shade panel and the rear driven shade panel open and close the opening, the first engaging portions of the front driving shade panel and the engaged portions of the rear driven shade panel contact and engage with one another. During such opening and closing operations of the front driving shade panel and the rear driven shade panel, abnormal noises caused by impacts due to the above-mentioned engagement may occur. In particular, when the front driving shade panel is quickly or forcefully slid, abnormal noises particularly occur, therefore making an occupant feel uncomfortable.

A need thus exists for a shade apparatus for a vehicle, which is not susceptible to the drawback mentioned above.

SUMMARY

According to an aspect of this disclosure, a shade apparatus for a vehicle includes a guide rail mechanism adapted to be arranged along a side portion of an inner periphery of an opening formed in an interior ceiling member of the vehicle, a shade panel mechanism slidably supported by the guide rail mechanism and configured to open and close the opening of the interior ceiling member, the shade panel mechanism including a first shade panel and a second shade panel, the first shade panel being arranged at one of front and rear sides of the opening, the second shade panel being arranged at the other of the front and rear sides of the opening and adjacent to the first shade panel, the first shade panel and the second shade panel movable relative to each other in a moving direction of the first shade panel and the second shade panel in the opening, an engaging member arranged at one of the first shade panel and the second shade panel, and an elastic member arranged at the other of the first shade panel and the second shade panel and including a fixing portion and a deformable portion, the fixing portion being fixed to the other of the first shade panel and the second shade panel, the deformable portion extending from the fixing portion with a predetermined length and including a contact surface contacting the engaging member when the other of the first shade panel and the second shade panel moves relative to one of the first shade panel and the second shade panel. In the shade apparatus, the first shade panel and the second shade panel move as a unit in the moving direction after one of the first shade panel and the second shade panel moves relative to the other of the first shade panel and the second shade panel in the moving direction and the engaging member engages with the elastic member.

According to another aspect of the disclosure, a shade apparatus for a vehicle includes a guide rail mechanism adapted to be arranged along a side portion of an inner periphery of an opening formed in an interior ceiling member of the vehicle, a first shade panel and a second shade panel slidably supported by the guide rail mechanism and movable relative to each other in a moving direction of the first shade panel and the second shade panel in the opening, the first shade panel being arranged at one of front and rear sides of the opening, the second shade panel being arranged at the other of the front and rear sides of the opening and adjacent to the first shade panel, and an engaging mechanism arranged between the first shade panel and the second shade panel, the engaging mechanism enabling the first shade panel and the second shade panel to align in a partially overlapping manner with each other in a vertical direction of the vehicle and close the opening when the first shade panel moves to one of the front and rear sides of the opening and to overlap with each other in the vertical direction of the vehicle and open the opening when the first shade panel moves to the other of the front and rear sides of the opening, the engaging mechanism including an engaging member arranged at one of the first shade panel and the second shade panel and an elastic member arranged at the other of the first shade panel and the second shade panel, the elastic member including a fixing portion and a deformable portion, the fixing portion being fixed to the other of the first shade panel and the second shade panel, the deformable portion extending from the fixing portion with a predetermined length and including a contact surface contacting the engaging member when the other of the first shade panel and the second shade panel moves relative to one of the first shade panel and the second shade panel.

According to further aspect of the disclosure, a shade apparatus for a vehicle includes a guide rail mechanism adapted to be arranged along a side portion of an inner periphery of an opening formed in an interior ceiling member of the vehicle, a shade panel mechanism including a first shade panel and a second shade panel slidably supported by the guide rail mechanism, the first shade panel and the second shade panel movable relative to each other along the guide rail mechanism in a moving direction of the first shade panel and the second shade panel in the opening, and an engaging mechanism enabling the first shade panel and the second shade panel to move as a unit when the first shade panel and the second shade panel move a predetermined distance in one direction of the moving direction in order to close the opening and to move as a unit when the first shade panel and the second shade panel move a predetermined distance in the other direction of the moving direction of the first shade panel and the second shade panel in order to open the opening, the engaging mechanism including an engaging member arranged at one of the first shade panel and the second shade panel, the engaging mechanism including an engaging member arranged at one of the first shade panel and the second shade panel and an elastic member arranged at the other of the first shade panel and the second shade panel, the elastic member including a fixing portion and a deformable portion, the fixing portion being fixed to the other of the first shade panel and the second shade panel, the deformable portion extending from the fixing portion with a predetermined length and including a contact surface contacting the engaging member when the other of the first shade panel and the second shade panel moves relative to one of the first shade panel and the second shade panel.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a sunroof apparatus 1 will be explained with reference to the illustrations of the FIGS. 1 to 7.

Figure 1:
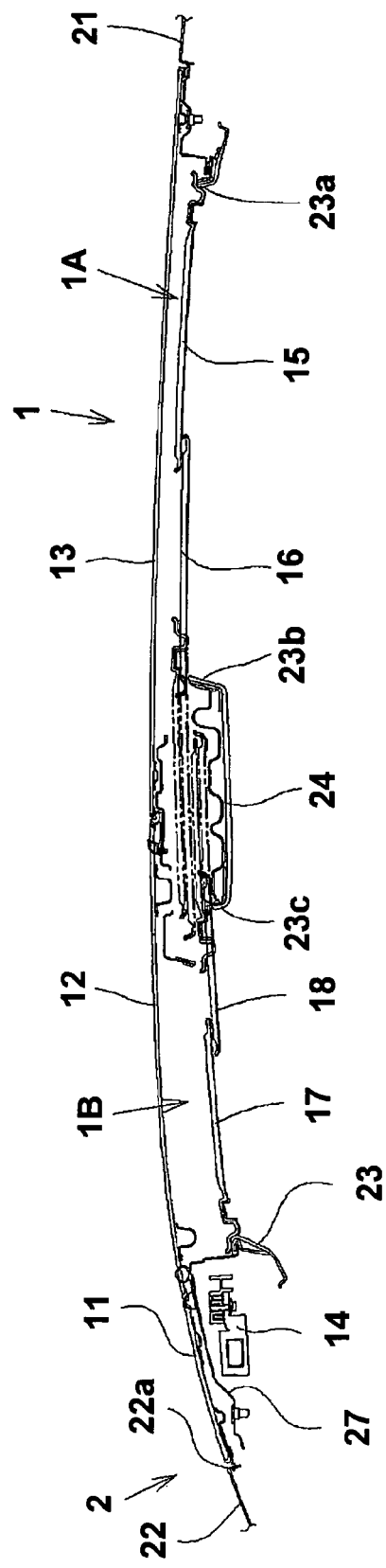
FIG. 1 is a vertical cross-sectional view of a sunroof apparatus in a longitudinal direction, which includes a shade apparatus for a vehicle according to an embodiment disclosed here.

FIG. 1 is a vertical cross-sectional view of a roof 21 in a longitudinal direction of a vehicle 2 on which the sunroof apparatus 1 is mounted. The left side in FIG. 1 corresponds to a front side of the vehicle 2 and an upper side in FIG. 1 corresponds to an upper side of the vehicle 2.

As shown in FIG. 1, the roof 21 of the vehicle 2 includes a roof panel 22 facing an exterior side of the vehicle 2 and a trim panel (interior ceiling member) 23 facing an interior side of the vehicle 2. An opening 22a is formed in the roof panel 22 and an opening 23a is formed in the trim panel 23.

The opening 22a of the roof panel 22 is opened and closed by a movement of two movable panels 11, 12 that are components of the sunroof apparatus 1. Further, light is let in through a fixed glass panel 13 in an inside of the vehicle 2. The movable panels 11, 12 are moved by an operation of a driving mechanism 14 arranged at a front portion of the roof 21. In addition, the moveable panels 11, 12, the fixed glass panel 13, and the driving mechanism 14 are known and therefore their detailed explanations are omitted.

The sunroof apparatus 1 includes a rear shade apparatus 1A and a front shade apparatus 1B each serving as a shade apparatus for the vehicle 2. The rear shade apparatus 1A includes a guide rail mechanism adapted to be arranged along side portions of an inner periphery of the opening 23a formed in the trim panel 23 and a shade panel mechanism slidably supported by the guide rail mechanism and configured to open and close the opening 23a. The shade panel mechanism of the rear shade apparatus 1A has two shade panels 15, 16 serving as a first shade panel and a second shade panel, respectively. The front shade apparatus 1B includes the guide rail mechanism adapted to be arranged along the side portions of the inner periphery of the opening 23a formed in the trim panel 23 and the shade panel mechanism slidably supported by the guide rail mechanism and configured to open and close the opening 23a. The shade mechanism of the front shade apparatus 1B has two shade panels 17, 18 serving as a first shade panel and a second shade panel, respectively. The opening 23a of the trim panel 23 is opened and closed by a movement of the shade panels 15, 16, 17, 18. The opening 23a of the trim panel 23 is divided into two sections in the longitudinal direction by a center trim panel 24 attached to base frames 27 serving as frameworks for attaching the sunroof apparatus 1 to the roof 21. The two divided sections of the opening 23a of the trim panel 23 are a rear opening 23b and a front opening 23c that face an rear opening area and a front opening area of the opening 22a of the roof panel 22, respectively. The shade panels 15, 16 of the shade panel mechanism of the rear shade apparatus 1A are arranged at a rear side of the opening 23a while the shade panels 17, 18 of the shade panel mechanism of the front shade apparatus 1B are arranged at a front side of the opening 23a. The shade panels 15, 16 of the shade panel mechanism of the rear shade apparatus 1A move as a unit in the moving direction after one of the shade panels 15, 16 moves relative to the other of the shade panels 15, 16 while the shade panels 17, 18 of the shade panel mechanism of the front shade apparatus 1B move as a unit in the moving direction after one of the shade panels 17, 18 moves relative to the other of the shade panels 17, 18. The rear opening 23b is opened and closed by the movement of the shade panels 15, 16 while the front opening 23c is opened and closed by the movement of the shade panels 17, 18. Further, configurations of the rear shade apparatus 1A and the front shade apparatus 1B are the same and differ from each other only in an opening/closing direction of the shade panels 15, 16, 17, 18 (the rear opening 23a is closed by a rearward movement of the shade panels 15, 16 of the rear shade apparatus 1A in the longitudinal direction while the front opening 23c is closed by a forward movement of the shade panels 17, 18 of the front shade apparatus 1B in the longitudinal direction). Accordingly, details of the rear shade apparatus 1A only will be explained hereinafter as follows.

Hereinafter, the rear shade apparatus 1A serving as a main portion of the sunroof apparatus 1 according to the embodiment will be explained.

Figure 2:
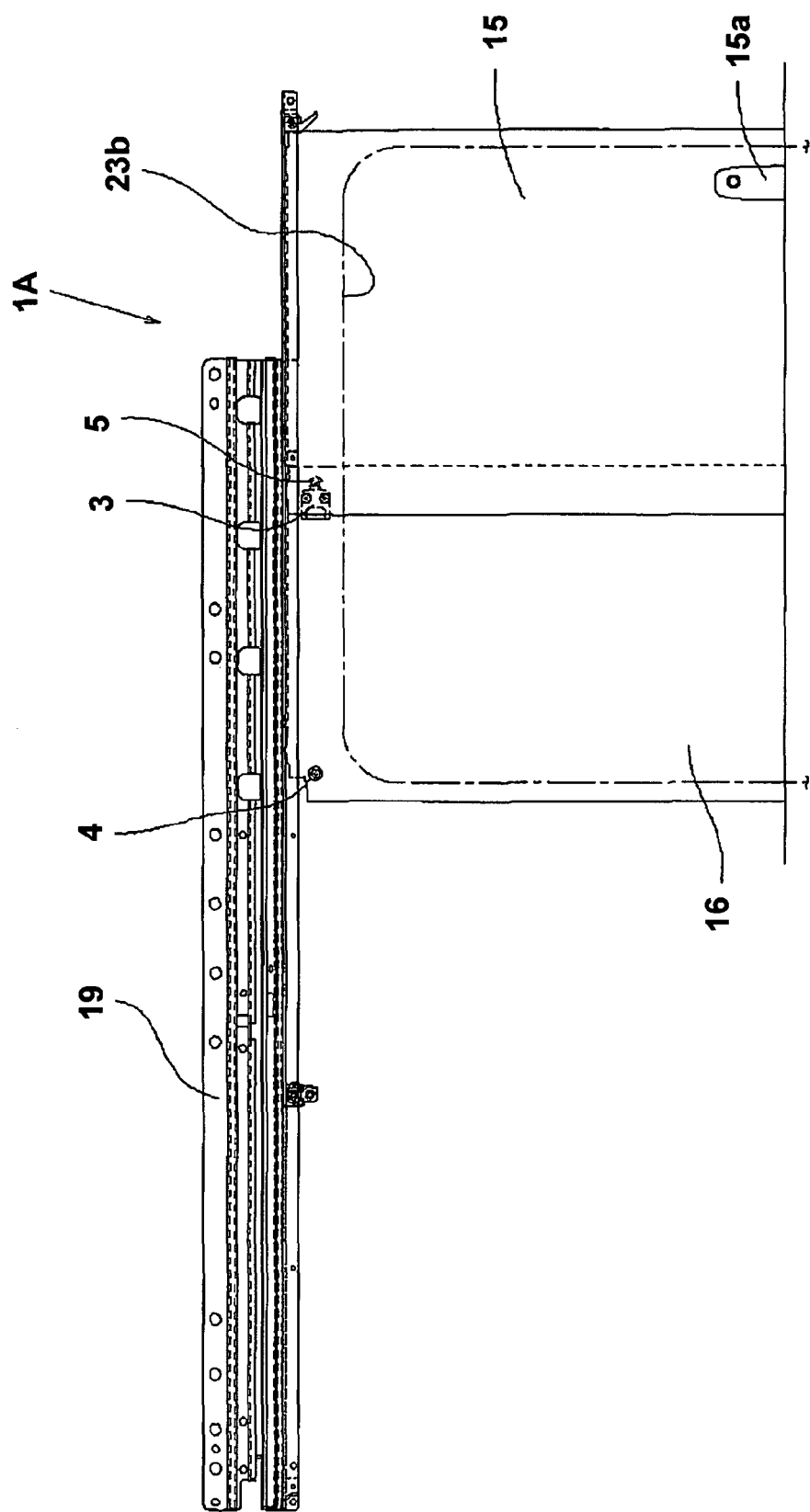
FIG. 2 is a plain view illustrating a closed condition of the shade apparatus according to the embodiment disclosed here.
Figure 3:
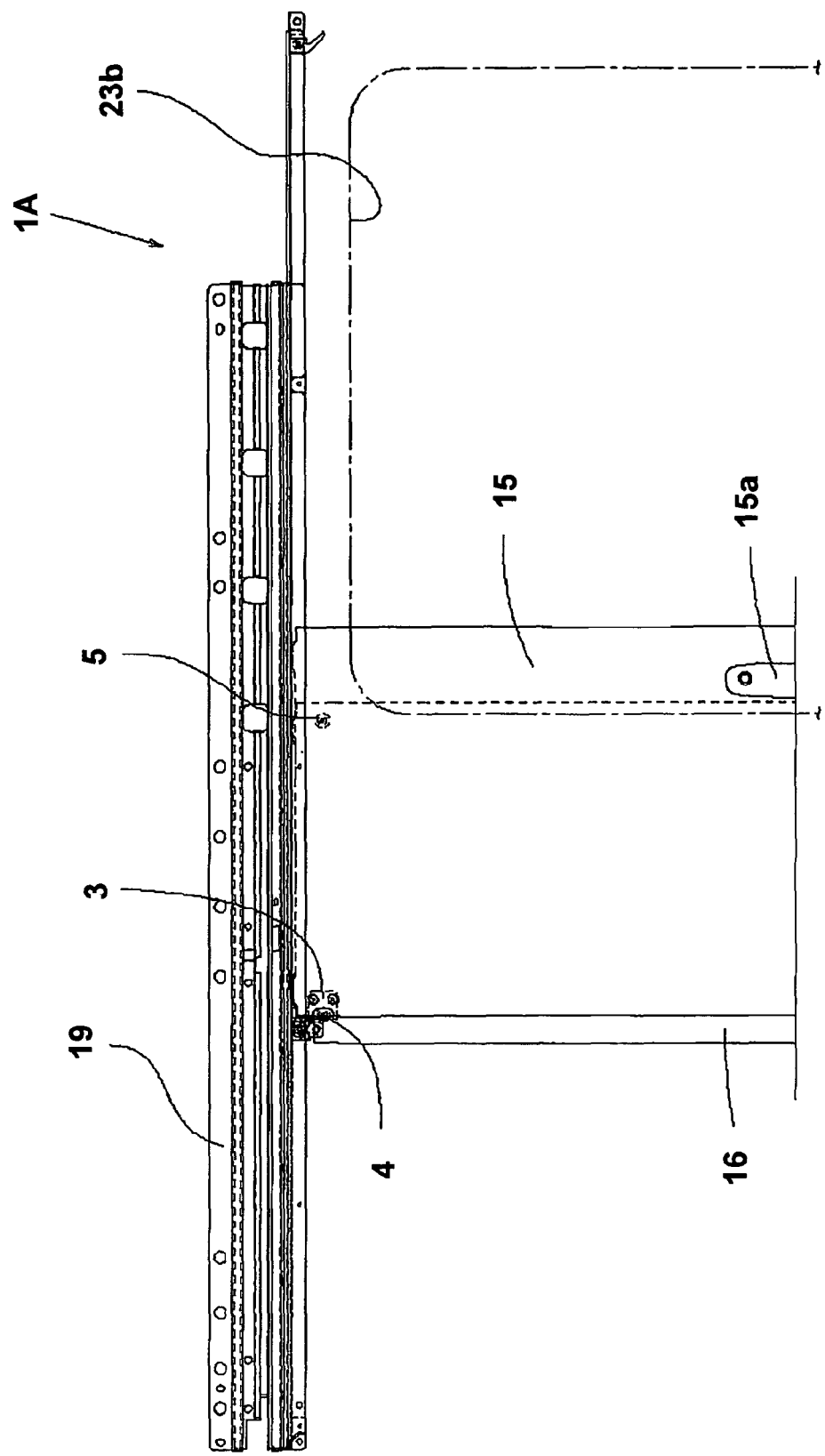
FIG. 3 is a plain view illustrating an opened condition of the shade apparatus according to the embodiment disclosed here.

Each of FIG. 2 and FIG. 3 is a plain view of the rear shade apparatus 1A. FIG. 2 shows a condition where the rear opening 23b of the trim panel 23 is closed by the shade panels 15, 16. FIG. 3 shows a condition where the rear opening 23b of the trim panel 23 is opened by the shade panels 15, 16. The rear shade apparatus 1A forms a bilaterally symmetric shape and configuration in the center of a width direction of the vehicle 2 (vertical directions in FIG. 2 and FIG. 3) and therefore each of FIG. 2 and FIG. 3 illustrates a half portion of the bilaterally symmetric shape, which corresponds to the right side of the vehicle 2. The left side of each FIG. 2 and FIG. 3 corresponds to the front side of the vehicle 2.

The guide rail mechanism of the rear shade apparatus 1A includes guide rails 19 extending along the longitudinal direction and arranged at the side portions of the opening 23a, in addition to the shade panels 15, 16. The shade panels 15, 16 are slidably supported by the guide rails 19 along the longitudinal direction that is the opening/closing direction of the shade panels 15, 16. As described above, since FIG. 2 and FIG. 3 show the half portion of the bilaterally symmetric shape and configuration of the rear shade apparatus 1A, the guide rail 19 arranged at the right side of the vehicle 2 is shown in FIG. 2 and FIG. 3.

Each of the guide rails 19 has a long shape extending along the longitudinal direction. The guide rails 19 extending along the longitudinal direction and arranged along the side edges of the opening 23a are fixed to the base frames 27. As will be described hereinafter, the shade panels 15, 16 are slidably supported by the guide rails 19 in the longitudinal direction that corresponds to the opening/closing direction. Further, the movable panels 11, 12, the fixed glass panel 13, and the shade panels 17, 18 of the front shade apparatus 1B are supported by the guide rails 19.

Figure 6:
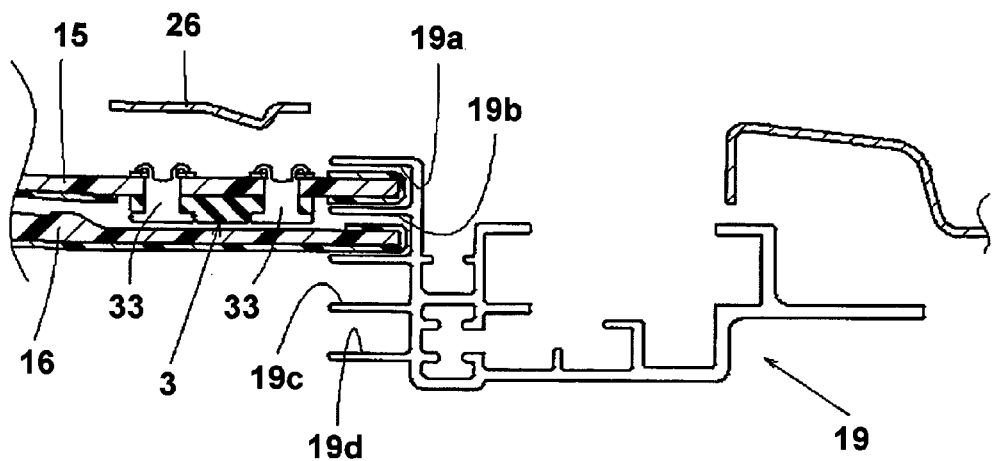
FIG. 6 is a cross-sectional view taken along the line VI-VI of FIG. 4.
Figure 7:
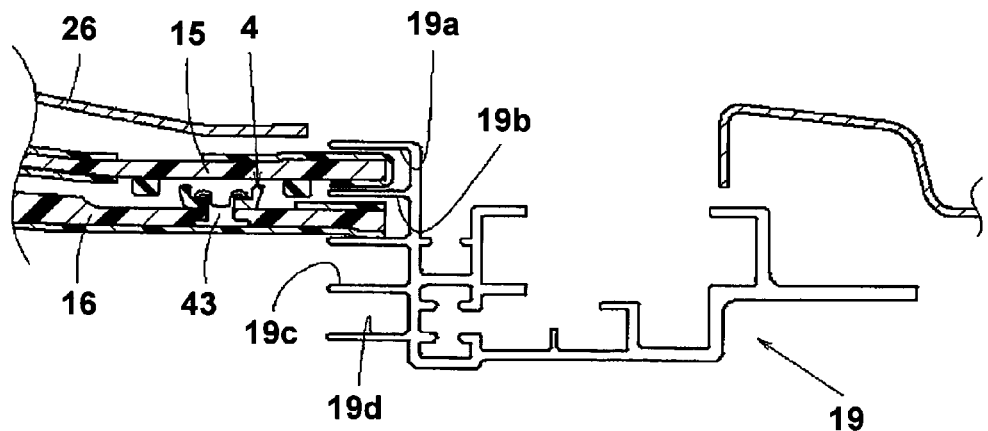
FIG. 7 is a cross-sectional view taken along the line VII-VII of FIG. 4.
Figure 8:
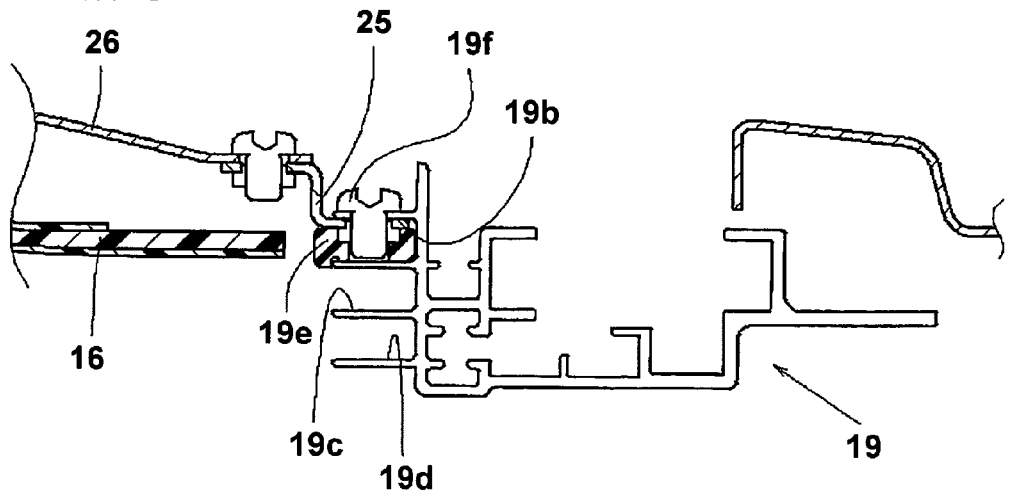
FIG. 8 is a cross-sectional view taken along the line VIII-VIII of FIG. 4.

As shown in FIGS. 6 to 8, the guide rail 19 includes vertical four-stepped guide grooves 19a, 19b, 19c, 19d extending along a longitudinal direction of the guide rail 19. The shade panel 15 is silidably supported by the guide groove 19a while the shade panel 16 is slidaby supported by the guide groove 19b. In a closed condition of the rear opening 23b, the shade panel 15 supported by the guide groove 19a is located further rearward than the shade panel 16 supported by the guide groove 19b in the closing direction of the shade panel 15 and the shade panel 16. As shown by full lines in FIG. 1 and shown in FIG. 2, under the closed condition of the rear opening 23b, the shade panels 15, 16 are arranged in the longitudinal direction that is the opening/closing direction and aligned so as to partially overlap each other in the vertical direction. As shown by chain double-dashed lines in FIG. 1 and shown in FIG. 3, in an opened condition of the rear opening 23b, the shade panels 15, 16 are accommodated within the center trim panel 24 so as to be overlapped with each other in the vertical direction. In addition, the guide grooves 19c, 19d are provided for supporting the shade panels 17, 18 of the front shade apparatus 1B, respectively.

Figure 10:
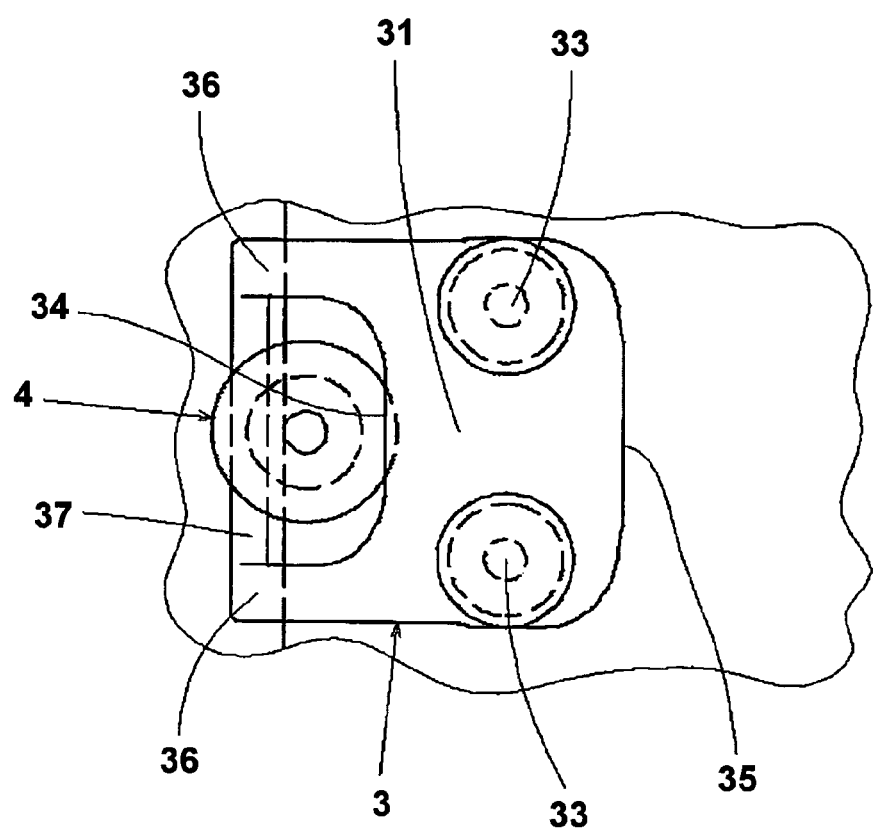
FIG. 10 is an explanatory diagram of operations of the elastic member and an engaging member when the shade apparatus according to the embodiment disclosed here is in an opening operation.
Figure 11:
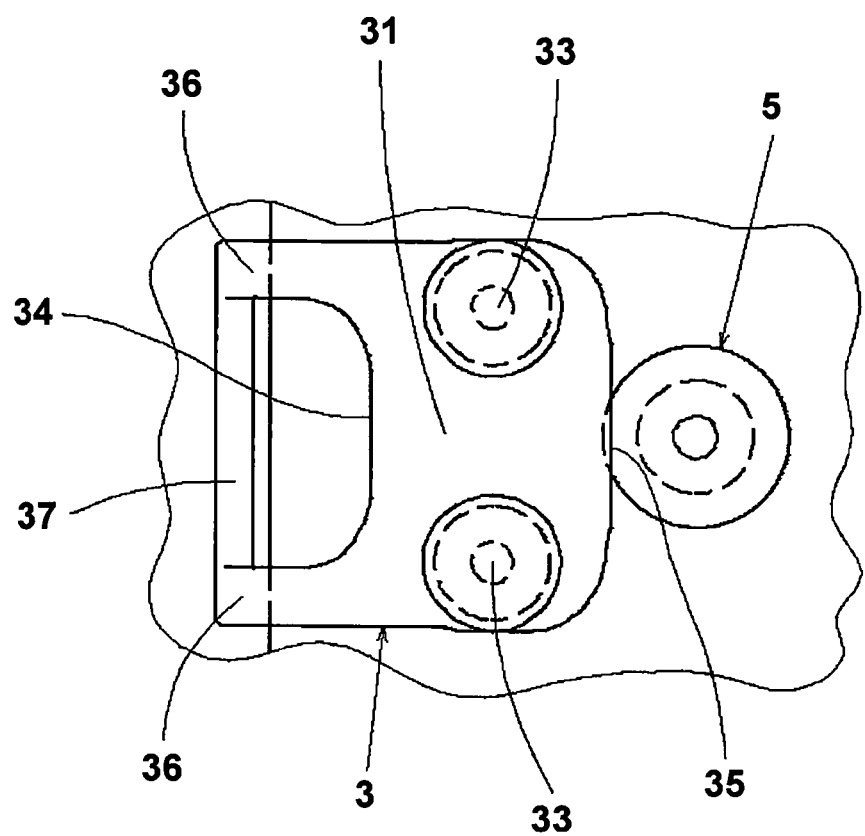
FIG. 11 is an explanatory diagram of operations of the elastic member and the engaging member when the shade apparatus according to the embodiment disclosed here is in a closing operation.

As shown in FIG. 2 and FIG. 3, the shade panel 15 includes an operating recessed portion 15a formed in the rear end portion in the center in the width direction. Further, a driving bush 3 serving as an elastic member is fixed to a front lateral end portion of the shade panel 15 in the longitudinal direction so as to stand vertically on the shade panel 15. An engaging mechanism is configured so as to enable the shade panels 15, 16 to move a predetermined distance in the closing direction as a unit in order to close the rear opening 23b and to move a predetermined distance in the opening direction in order to open the rear opening 23b. The engaging mechanism includes engaging bushes (first and second engaging bushes) 4, 5 serving as engaging members. The engaging bushes 4, 5 are fixed to front and rear lateral end portions of the shade panel 16 in the longitudinal direction. The driving bush 3 of the shade panel 15 is arranged between the engaging bushes 4, 5 of the shade panel 16 in the longitudinal direction so as to engage with the engaging bushes 4, 5 in accordance with opening and closing movements of the shade panel 15. Under the closed condition of the rear opening 23b (shown in FIG. 2), a user of the sunroof apparatus 1 places his/her finger on the operating recessed portion 15a and moves the shade panel 15 in the opening direction (to the left direction in FIG. 2). At this time, the shade panel 15 slides along the guide groove 19a in the opening direction while being guided by the guide groove 19a of the guide rail 19. As shown in FIG. 10, in a sliding condition of the shade panel 15, the driving bush 3 of the shade panel 15 engages with the engaging bush 4 located at the front lateral end portion of the shade panel 16 in the longitudinal direction. Accordingly, the shade panel 16 is moved by the shade panel 15 in the opening direction, therefore sliding along the guide grooves 19b therein while being guided by the guide groove 19b in accordance with the sliding movement of the shade panel 15. Thus, the rear opening 23b in the opened condition (as shown in FIG. 3) is generated. Meanwhile, under the opened condition of the rear opening 23b, the user places his/her finger on the opening recessed portion 15a and moves the shade panel 15 in the closing direction. Accordingly, the shade panel 15 is pushed out from the center trim panel 24 and moved in the closing direction (to the right direction in FIG. 3), therefore sliding along the guide groove 19a of the guide rail 19 in the closing direction while being guided by the guide groove 19a. As shown in FIG. 11, under the sliding condition of the shade panel 15, the driving bush 3 of the shade panel 15 engages with the engaging bush 5 located at the rear lateral end portion of the shade panel 16 in the longitudinal direction. Accordingly, the shade panel 16 is pushed out from the center trim panel 24 and moved in the closing direction by the shade panel 15, therefore sliding along the guide groove 19b of the guide rail 19 in the closing direction while being guided by the guide groove 19b in accordance with the sliding movement of the shade panel 15. Thus, the rear opening 23b in the closed condition (as shown in FIG. 2) is generated. As described above, the shade panel 15 serves as a driving shade panel and the shade panel 16 serves as a driven shade panel. The driving shade panel includes an operating portion to which a driving force is applied. The driving bush 3 is arranged on the driving shade panel so as to stand vertically thereon. Meanwhile, the driven shade panel is driven by the driving shade panel due to the engagement between the engaging bushes 4, 5 and the driving bush 3. Further, the engaging bushes 4, 5 are arranged on the driven shade panel so as to stand vertically thereon.

Figure 4:
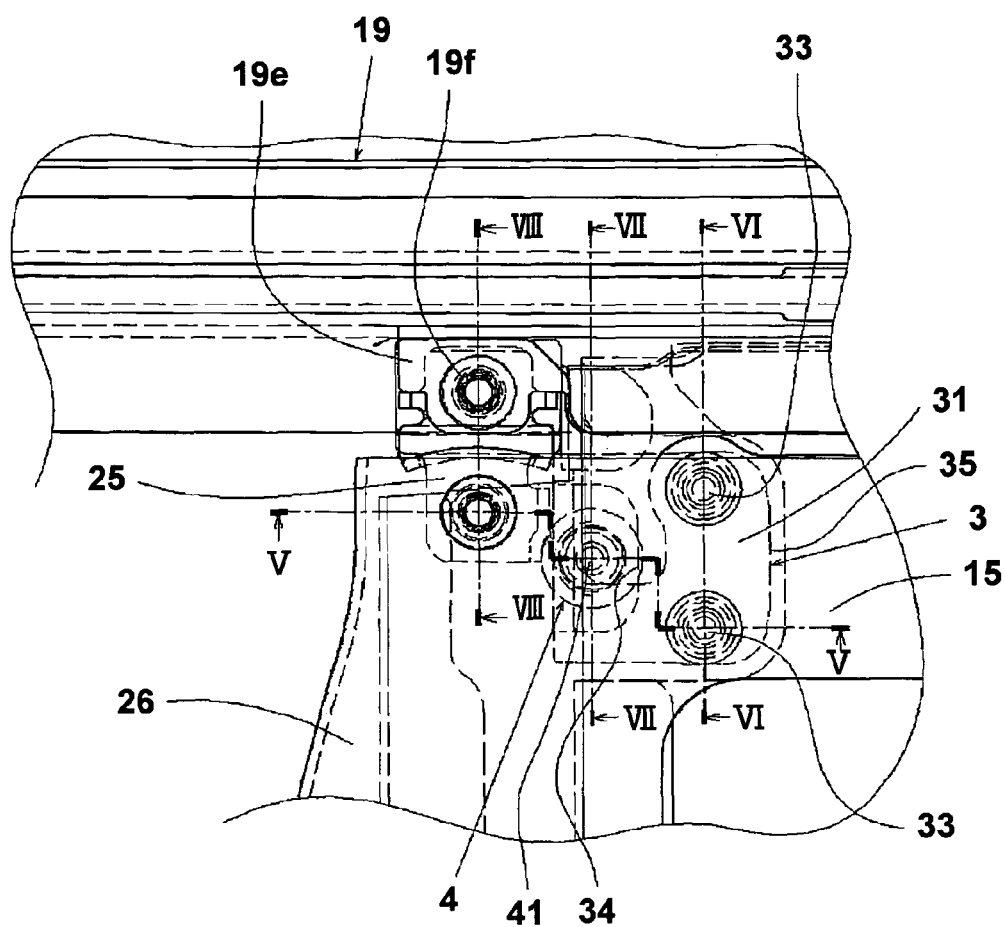
FIG. 4 is an enlarged plain view of a main portion of the shade apparatus according to the embodiment disclosed here.
Figure 9:
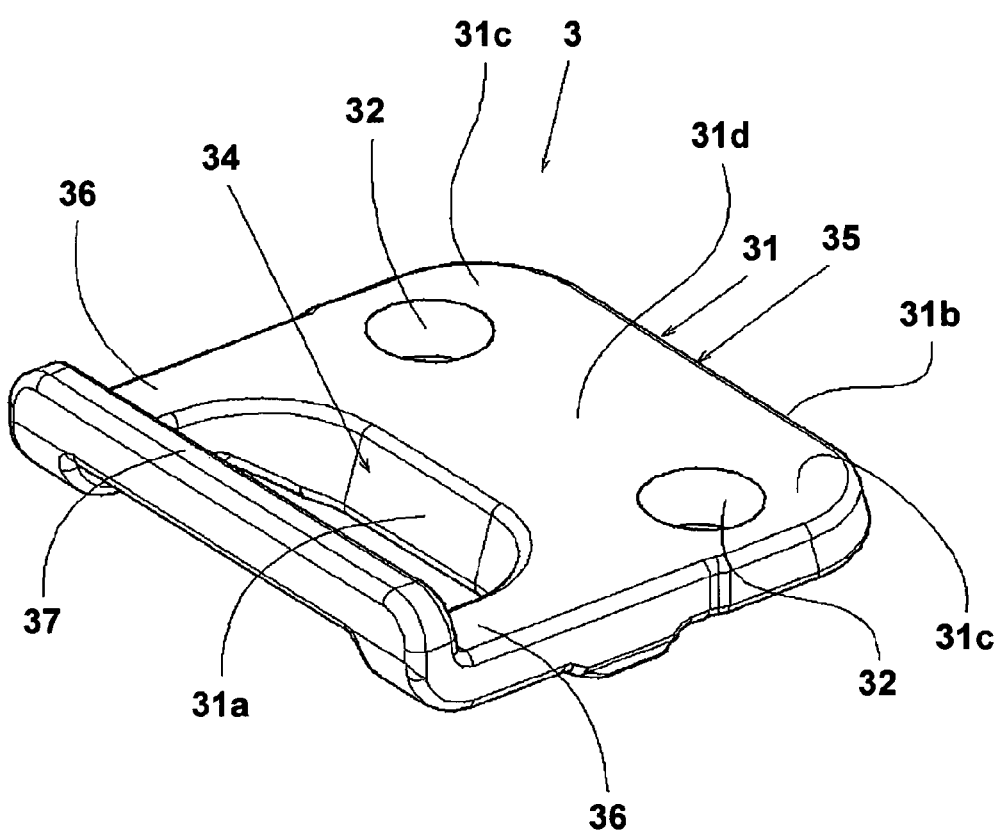
FIG. 9 is a perspective view of an elastic member of the shade apparatus according to the embodiment disclosed here.

Next, details of the driving bush 3 and the engaging bushes 4, 5 will be described as follows with reference to FIGS. 4 to 9. Since configurations of the engaging bushes 4, 5 are the same, only the configuration of the engaging bush 4 will be explained below. FIG. 4 is a plain view showing a detailed condition of one of the front lateral end portions of the shade panels 15, 16 of the rear shade apparatus 1A in the longitudinal direction under a condition where the rear opening 23b of the opening 23a formed in the trim panel 23 is opened. The right side in FIG. 4 corresponds to the rear side of the vehicle 2 and the vertical direction in FIG. 4 corresponds to the width direction of the vehicle 2. FIG. 9 is a perspective view of the driving bush 3. Under an attached condition of the shade panel 15, the horizontal direction in FIG. 9 corresponds to the longitudinal direction of the vehicle 2 and the perspective direction in FIG. 9 corresponds to the width direction of the vehicle 2.

Figure 5:
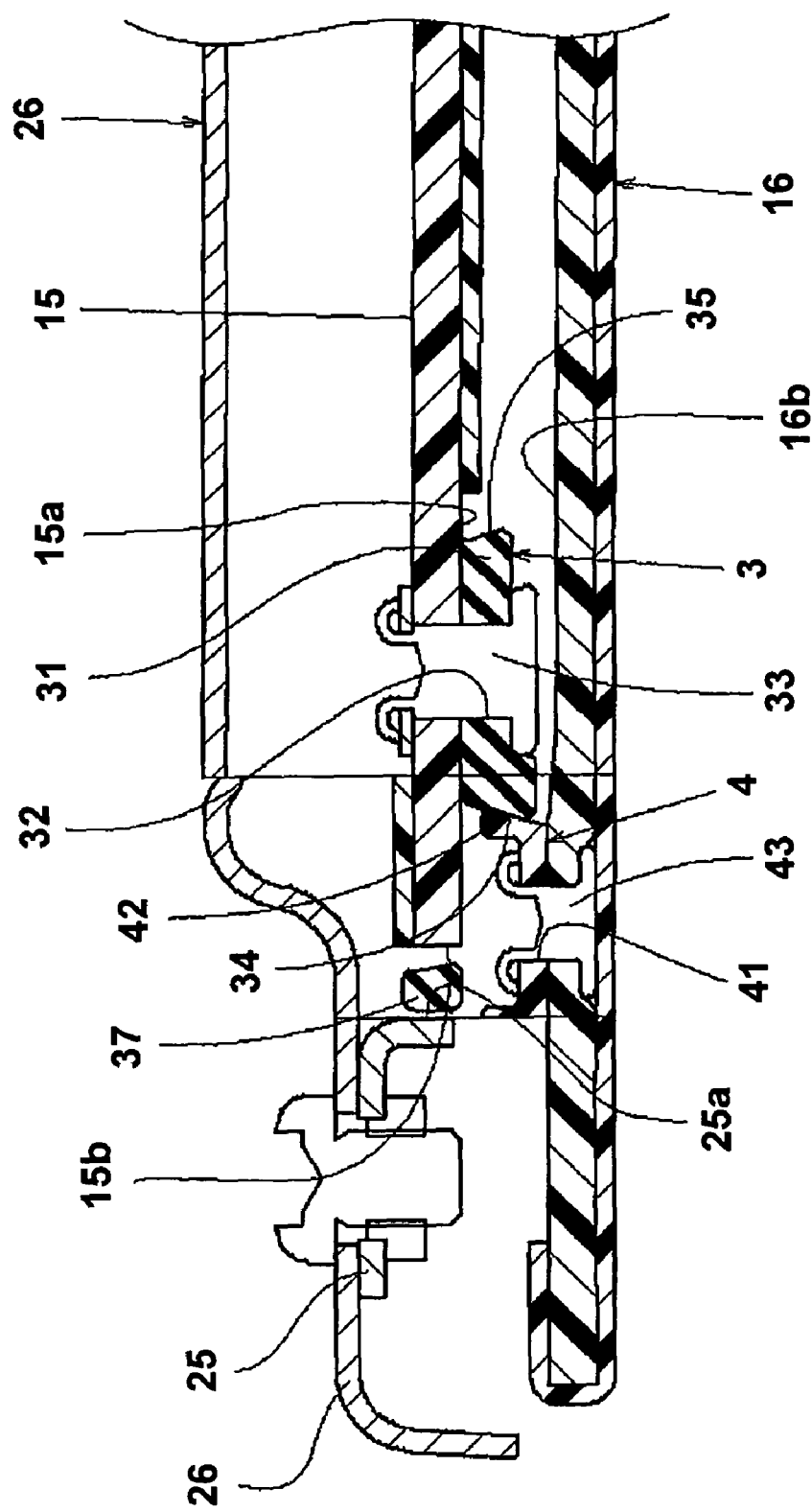
FIG. 5 is a cross-sectional view taken along the line V-V of FIG. 4.

As shown in FIG. 4, FIG. 5, and FIG. 7, the engaging bush 4 arranged at the front lateral end portion of the shade panel 16 in the longitudinal direction is made of resin. The engaging bush 4 includes a through-hole 41 formed in the center and an annular flanged portion 42 formed around the through-hole 41. The engaging bush 4 is fixed to a rear surface 16b (seen from the interior side of the vehicle 2) of the shade panel 16, which faces the exterior side of the vehicle 2, with a pin 43 inserted in the through-hole 41.

As shown in FIGS. 4 to 6, and FIG. 9, the driving bush 3 includes an elastic member such as rubber. Further, the driving bush 3 includes a bush main body 31 forming an approximately rectangular plate shape. A pair of through-holes 32 is formed in the bush main body 31 of the driving bush 3. Each of the through-holes 32 penetrates through the bush main body 31 in the thickness direction. The through-holes 32 are located away from each other and close to both ends in the width direction of the driving bush 3. Pins 33 are inserted into the through holes 32, thereby fixing the driving bush 3 to a front surface 15a (seen from the interior side of the vehicle 2) of the shade panel 15, which faces the interior side of the vehicle 2. A first contact surface 34 is formed on a first end face 31a in a longitudinal direction of the bush main body 31 (to the left in FIG. 4). When the driving bush 3 engages with the engaging bush 4, the first contact surface 34 contacts the flanged portion 42 of the engaging bush 4. A second contact surface 35 is formed on a second end face 31b (to the right in FIG. 4) in the longitudinal direction of the bush main body 31. When the driving bush 3 engages with the engaging bush 5, the second contact surface 35 contacts an annular flanged portion formed around a through-hole of the engaging bush 5. Further, portions on the bush main body 31 in which the through-holes 32 are formed respectively serve as fixing portions 31c. A portion defined between the fixing portions 31c of the bush main body 31 serves as a deformable portion 31d extending between the fixing portions 31c in the width direction with a predetermined distance therebetween. The first and second contact surfaces 34, 35 are formed on the deformable portion 31d of the bush main body 31 in the longitudinal direction.

As shown in FIG. 4, FIG. 5, and FIG. 9, a pair of arm portions 36 is integrally formed with the fixing portions 31c so as to extend from the first end face 31a of the bush main body 31 toward the front direction of the vehicle 2 (to the left in FIG. 4). The arm portions 36 are arranged with a distance therebetween larger than a diameter of the engaging bush 4. Both ends of the arm portions 36 are connected with each other by a cross-linking portion (contacting portion) 37. The cross-linking portion 37 protruding upwardly from the fixing portions 31c is located at an upper position relative to the position of the bush main body 31 in the vertical direction of the vehicle 2 (upper side in FIG. 5). Further, the cross-linking portion 37 is arranged further rearward (to the right in FIG. 5) than a front end face 15b (end face) of the shade panel 15 in the longitudinal direction of vehicle 2 so as to face the front end face 15b.

As shown in FIG. 4, FIG. 5, and FIG. 8, a stopper member 19e is fixed to the guide groove 19b of each of the guide rails 19 supporting the shade panel 16, with a screw 19f. The stopper member 19e is located further forward (to the left shown in FIG. 4) than the position of the shade panel 16 in the opening condition of the rear opening 23b. At this time, the stopper member 19e is in contact with a front end face of the shade panel 16 in the opening condition of the rear opening 23b, thereby stopping a sliding movement of the shade panels 15, 16 in the opening direction. Further, a garnish 26 is fixed to the guide rail 19 via a bracket 25 (wall member) fixed to the guide rail 19 together with the screw 19f. The garnish 26 extends in the width direction (vertical direction in FIG. 4) of the vehicle 2. The garnish 26 and the center trim panel 24 allow the shade panels 15, 16 accommodated within the center trim panel 24 not to be easily seen from the interior side of the vehicle 2 in the opening condition of the rear opening portion 23b, thereby improving an appearance of the roof 21. Furthermore, in the opening condition of the rear opening 23b, the cross-linking portion 37 of the driving bush 3 is located between the front end face 15b of the shade panel 15 and a rear end face 25a (to the right in FIG. 5) of the bracket 25, by which the garnish 26 is fixed relative to the guide rail 19, thereby making contact with the rear end face 25a of the bracket 25.

Details of an operation of the driving bush 3 included in the rear shade apparatus 1A will be explained hereinafter as follows. The driving bush 3 included in the front shade apparatus 1B having the same configuration as the rear shade apparatus 1A operates in the same way as the driving bush 3 of the rear shade apparatus 1A operates.

In the closed condition of the rear opening 23b of the trim panel 23 shown in FIG. 2, the shade panel 15 of the rear shade apparatus 1A is moved and slid toward the front direction corresponding to the opening direction in order to open the rear opening 23b. Afterwards, the driving bush 3 engages with the engaging bush 4, thereby moving and sliding the shade panel 16 toward the front direction corresponding to the opening direction in accordance with the sliding movement of the shade panel 15. Under this condition, as shown in FIG. 10, the first contact surface 34 of the driving bush 3 contacts the flanged portion 42 of the engaging bush 4, thereby transmitting a driving force from the shade panel 15 to the shade panel 16. At this time, the deformable portion 31d of the driving bush 3 is compressed and deformed in the rear direction relative to the fixing portions 31c. Thus, the driving bush 3 absorbs an impact caused by the engagement between the driving bush 3 and the engaging bush 4 and prevents the occurrence of an abnormal noise. Meanwhile, in the opened condition of the rear opening 23b shown in FIG. 3, the cross-linking portion 37 of the driving bush 3 contacts with the bracket 25, thereby stopping the sliding movement of the shade panel 15 and preventing the shade panels 15, 16 from sliding too forward in the opening direction. Further, an impact caused by the contact between the cross-linking portion 37 and the bracket 25 is absorbed by an elastic deformation of the cross-linking portion 37, thereby reducing the occurrence of an abnormal noise.

In the opened condition of the rear opening 23b of the trim panel 23 shown in FIG. 3, the shade panel 15 of the rear shade apparatus 1A is pushed and slid toward the rear direction corresponding to the closing direction in order to close the rear opening 23b. Afterwards, the driving bush 3 engages with the engaging bush 5, thereby pushing and sliding the shade panel 16 in the rear direction corresponding to the closing direction in accordance with the sliding movement of the shade panel 15. Under this condition, the second contact surface 35 of the driving bush 3 contacts the flanged portion of the engaging bush 5, thereby transmitting a driving force from the shade panel 15 to the shade panel 16. At this time, the deformable portion 31d of the driving bush 3 is compressed and deformed in the front direction relative to the fixing portions 31. Thus, the driving bush 3 absorbs an impact caused by the engagement between the driving bush 3 and the engaging bush 5 and prevents the occurrence of an abnormal noise.

As described above, the deformable portion 31d of the bush main body 31 is compressed and deformed, therefore effectively preventing the occurrence of abnormal noises caused by the engagement between the driving bush 3 and the engaging bush 4 and between the driving bush 3 and the engaging bush 5. Accordingly, quiet opening and closing operations of the rear shade apparatus 1A may be realized. In addition, compared to a case where impacts caused by the engagement between the driving bush 3 and the engaging bush 4 and the driving bush 3 and the engaging bush 5 are absorbed only by the deformable portion 31d of the driving bush 3, a large impact may be absorbed. Accordingly, the size of the driving bush 3 is reduced. As a result, an attaching space of the driving bush 3 in the shade panel 15 is minimized. This leads to a reduction of a redundant area on the shade panel 15, therefore realizing the rear shade apparatus 1A that is highly effective in cost and weight.

The sunroof apparatus 1 in the embodiment includes the movable panels 11, 12 and the fixed glass panel 13; however, the number of movable panels is not limited to the number of the movable panels 11, 12 described in the embodiment and therefore one or more movable panels may be applied. Moreover, the sunroof apparatus 1 may include a combination of a movable panel and a fixed glass panel or include a movable panel or a fixed panel only.

In the embodiment, the opening 23a formed in the trim panel 23 is divided into the rear opening 23b and the front opening 23c and the sunroof apparatus 1 includes the rear shade apparatus 1A and the front shade apparatus 1B; however, it is not necessary for the opening 23a to be divided into the rear opening 23b and the front opening 23c. When the opening 23a is not divided, the sunroof apparatus 1 includes one shade apparatus. Furthermore, the shade apparatus may include two or more shade panels.

In the embodiment, the driving bush 3 includes two fixing portions 31c by which the deformable portion 31d is supported. The driving bush 3 may be configured to include one fixing portion supporting the deformable portion 31d. Moreover, the deformable portion 31d is not necessarily a solid portion. A through-hole may be formed in the deformable portion 31d for enabling the driving bush 3 to be easily deformed.

As described above, in the opening and closing operations of the first shade panel 15, 17 and the second shade panel 16, 18, the engaging bushes 4, 5 engage with the contact surfaces 31a, 31b of the driving bush 3, thereby transmitting a driving force of the first shade panel 15, 17 to the second shade panel 16, 18. At this time, the driving bush 3 is deformed; therefore the impact caused by the engagement among the engaging bushes 4, 5 and the driving bush 3 is absorbed. Consequently, the occurrence of abnormal noises during the opening and closing operations of the first shade panel 15, 17 and the second shade panel 16, 18 is prevented. Moreover, the deformable portion 31d including the contact surfaces 31a, 31b contacting the engaging bushes 4, 5 extends from the fixing portions 31c, thereby being compressed and deformed when the engaging bushes 4, 5 and the driving bush 3 engage with one another. Accordingly, the impact caused by such engagement is effectively absorbed. Thus the size of the driving bush 3 is reduced and a space for arranging the driving bush 3 is minimized.

According to the embodiment, the engaging bush includes the first and second engaging bushes 4, 5 fixed to one of the first shade panel 15, 17 and the second shade panel 16, 18 with a predetermined distance between each other in the moving direction, and the driving bush 3 is fixed to the other of the first shade panel 15, 17 and the second shade panel 16, 18 at the fixing portions 31c so that the contacting surfaces 31a, 31b of the driving bush 3 is arranged between the first and second engaging bushes 4, 5.

According to the embodiment, the driving bush 3 includes the cross-linking portion 37 contacting with the bracket 25, which is supported by the guide rail 19, when the other of the first shade panel 15, 17 and the second shade panel 16, 18 moves relative to one of the first shade panel 15, 17 and the second shade panel 16, 18.

Accordingly, the driving bush 3 may serves as a stopper member relative to the second shade panel 16, 18, therefore reducing the number of components of the shade apparatus 1A, 1B and preventing the occurrence of abnormal noises when a sliding movement of the second shade panel 16, 18 stops.

According to the embodiment, the first shade panel 15, 17 includes the driving shade panel having the operating portion to which a driving force is applied and provided with the vertically-standing driving bush 3, and the second shade panel 16, 18 includes the driven shade panel driven by the driving shade panel due to the engagement among the engaging bushes 4, 5 and the driving bush 3 and provided with the vertically-standing engaging bushes 4, 5.

According to the embodiment, the cross-linking portion 37 is formed to protrude upwardly from the fixing portions 31c and arranged between the bracket 25 and the end face (front end face 15b) of the first shade panel 15, 17 in the opening direction of the first shade panel 15, 17.

Accordingly, the driving bush 3 may serves as the stopper member for the first shade panel 15, 17, therefore reducing the number of components of the shade apparatus 1A and preventing the occurrence of abnormal noises when the first shade panel 15, 17 is quickly or forcibly slid and thereby is slid too forward in the opening direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A shade apparatus for a vehicle, comprising:
a guide rail mechanism adapted to be arranged along a side portion of an inner periphery of an opening formed in an interior ceiling member of the vehicle;

a shade panel mechanism slidably supported by the guide rail mechanism and configured to open and close the opening of the interior ceiling member, the shade panel mechanism including a first shade panel and a second shade panel, the first shade panel being arranged at one of front and rear sides of the opening, the second shade panel being arranged at the other of the front and rear sides of the opening and adjacent to the first shade panel, the first shade panel and the second shade panel movable relative to each other in a moving direction of the first shade panel and the second shade panel in the opening;

an engaging member arranged at one of the first shade panel and the second shade panel; and an elastic member arranged at the other of the first shade panel and the second shade panel and including a fixing portion and a deformable portion, the fixing portion being fixed to the other of the first shade panel and the second shade panel, the deformable portion extending from the fixing portion with a predetermined length and including a contact surface contacting the engaging member when the other of the first shade panel and the second shade panel moves relative to one of the first shade panel and the second shade panel, wherein the first shade panel and the second shade panel move as a unit in the moving direction after one of the first shade panel and the second shade panel moves relative to the other of the first shade panel and the second shade panel in the moving direction and the engaging member engages with the elastic member so that the deformable portion is compressed and deformed, wherein the elastic member includes a contacting portion contacting with a wall member, which is supported by the guide rail mechanism, when the other of the first shade panel and the second shade panel moves relative to one of the first shade panel and the second shade panel, and wherein the wall member is fixed to the guide rail mechanism.

2. The shade apparatus according to claim 1, wherein the engaging member includes first and second engaging bushes fixed to one of the first shade panel and the second shade panel with a predetermined distance between each other in the moving direction, and the elastic member is fixed to the other of the first shade panel and the second shade panel at the fixing portion so that the contacting surface of the elastic member is arranged between the first and second engaging bushes.

3. The shade apparatus according to claim 1, wherein the first shade panel includes a driving shade panel having an operating portion to which a driving force is applied and provided with the elastic member standing vertically on the driving shade panel, and the second shade panel includes a driven shade panel driven by the driving shade panel due to the engagement between the engaging member and the elastic member and provided with the engaging member standing vertically on the driven shade panel.

4. The shade apparatus according to claim 3, wherein the contacting portion is formed to protrude upwardly from the fixing portion and arranged between the wall member and an end portion of the driving shade panel in an opening direction of the driving shade panel.

5. A shade apparatus for a vehicle, comprising:
a guide rail mechanism adapted to be arranged along a side portion of an inner periphery of an opening formed in an interior ceiling member of the vehicle;

a first shade panel and a second shade panel slidably supported by the guide rail mechanism and movable relative to each other in a moving direction of the first shade panel and the second shade panel in the opening, the first shade panel being arranged at one of front and rear sides of the opening, the second shade panel being arranged at the other of the front and rear sides of the opening and adjacent to the first shade panel; and an engaging mechanism arranged between the first shade panel and the second shade panel, the engaging mechanism enabling the first shade panel and the second shade panel to align in a partially overlapping manner with each other in a vertical direction of the vehicle and close the opening when the first shade panel moves to one of the front and rear sides of the opening and to overlap with each other in the vertical direction of the vehicle and open the opening when the first shade panel moves to the other of the front and rear sides of the opening, the engaging mechanism including an engaging member arranged at one of the first shade panel and the second shade panel and an elastic member arranged at the other of the first shade panel and the second shade panel, the elastic member including a fixing portion and a deformable portion, the fixing portion being fixed to the other of the first shade panel and the second shade panel, the deformable portion extending from the fixing portion with a predetermined length and including a contact surface contacting the engaging member when the other of the first shade panel and the second shade panel moves relative to one of the first shade panel and the second shade panel, the deformable portion being compressed and deformed when the engaging member engages with the elastic member, wherein the elastic member includes a contacting portion contacting with a wall member, which is supported by the guide rail mechanism, when the other of the first shade panel and the second shade panel moves relative to one of the first shade panel and the second shade panel, and wherein the wall member is fixed to the guide rail mechanism.

6. The shade apparatus according to claim 5, wherein the engaging member includes first and second engaging bushes fixed to one of the first shade panel and the second shade panel with a predetermined distance between each other in the moving direction, and the elastic member is fixed to the other of the first shade panel and the second shade panel at the fixing portion so that the contacting surface of the elastic member is arranged between the first and second engaging bushes.

7. The shade apparatus according to claim 5, wherein the first shade panel includes a driving shade panel having an operating portion to which a driving force is applied and provided with the vertically-standing elastic member, and the second shade panel includes a driven shade panel driven by the driving shade panel due to the engagement between the engaging member and the elastic member and provided with the vertically-standing engaging member.

8. The shade apparatus according to claim 7, wherein the contacting portion is formed to protrude upwardly from the fixing portion and arranged between the wall member and an end portion of the driving shade panel in an opening direction of the driving shade panel.

9. A shade apparatus for a vehicle, comprising:
a guide rail mechanism adapted to be arranged along a side portion of an inner periphery of an opening formed in an interior ceiling member of the vehicle;

a shade panel mechanism including a first shade panel and a second shade panel slidably supported by the guide rail mechanism, the first shade panel and the second shade panel movable relative to each other along the guide rail mechanism in a moving direction of the first shade panel and the second shade panel in the opening; and an engaging mechanism enabling the first shade panel and the second shade panel to move as a unit when the first shade panel and the second shade panel move a predetermined distance in one direction of the moving direction in order to close the opening and to move as a unit when the first shade panel and the second shade panel move a predetermined distance in the other direction of the moving direction of the first shade panel and the second shade panel in order to open the opening, the engaging mechanism including an engaging member arranged at one of the first shade panel and the second shade panel, the engaging mechanism including an engaging member arranged at one of the first shade panel and the second shade panel and an elastic member arranged at the other of the first shade panel and the second shade panel, the elastic member including a fixing portion and a deformable portion, the fixing portion being fixed to the other of the first shade panel and the second shade panel, the deformable portion extending from the fixing portion with a predetermined length and including a contact surface contacting the engaging member when the other of the first shade panel and the second shade panel moves relative to one of the first shade panel and the second shade panel, the deformable portion being compressed and deformed when the engaging member engages with the elastic member, wherein the elastic member includes a contacting portion contacting with a wall member, which is supported by the guide rail mechanism, when the other of the first shade panel and the second shade panel moves relative to one of the first shade panel and the second shade panel, and wherein the wall member is fixed to the guide rail mechanism.

10. The shade apparatus according to claim 9, wherein the engaging member includes first and second engaging bushes fixed to one of the first shade panel and the second shade panel with a predetermined distance between each other in the moving direction, and the elastic member is fixed to the other of the first shade panel and the second shade panel at the fixing portion so that the contacting surface of the elastic member is arranged between the first and second engaging bushes.

11. The shade apparatus according to claim 9, wherein the first shade panel includes a driving shade panel having an operating portion to which a driving force is applied and provided with the vertically-standing elastic member, and the second shade panel includes a driven shade panel driven by the driving shade panel due to the engagement between the engaging member and the elastic member and provided with the vertically-standing engaging member.

12. The shade apparatus according to claim 11, wherein the contacting portion is formed to protrude upwardly from the fixing portion and arranged between the wall member and an end portion of the driving shade panel in an opening direction of the driving shade panel.

* * * * *